United States Patent [19]

Ansell et al.

[11] Patent Number: 5,202,197
[45] Date of Patent: Apr. 13, 1993

[54] DATA PROCESSING DEVICE HAVING AN IMPROVED MANUALLY OPERATED BATTERY EJECT MECHANISM AND A WARNING LIGHT

[75] Inventors: Daniel F. Ansell, Coral Springs; Hunter T. Foy, Boca Raton, both of Fla.

[73] Assignee: International Business Machines Corporation, Armonk, N.Y.

[21] Appl. No.: 778,533

[22] Filed: Oct. 17, 1991

[51] Int. Cl.⁵ .............................................. H01M 2/00
[52] U.S. Cl. ........................................ 429/97; 429/96; 429/98; 429/90; 429/100; 429/121; 429/123; 429/178; 365/52; 365/226; 365/228; 365/229
[58] Field of Search ...................... 429/96–97, 429/98, 90, 100, 121, 123, 178; 365/52, 226, 228, 229

[56] References Cited

U.S. PATENT DOCUMENTS 4,752,539 6/1988 Volter .................................... 429/1
4,957,831 9/1990 Meredith et al. .................. 429/121

Primary Examiner—Olik Chaudhuri
Assistant Examiner—M. Nuzzolillo
Attorney, Agent, or Firm—G. E. Grosser; D. R. McKechnie; George Simon

[57] ABSTRACT

A data processing device has a battery compartment in which a battery is fastened by a releasible latch. A manually actuated eject button is used to release the battery. A light is source is placed in or near the eject button and provides, when illuminated, a light signal warning the user not to eject the battery. The eject button is covered by a door, and both the door and button are designed for two handed operation which, in addition to preventing accidental actuation of the button, forces the user to concentrate attention on the eject button and warning light.

5 Claims, 2 Drawing Sheets

5,202,197

DATA PROCESSING DEVICE HAVING AN IMPROVED MANUALLY OPERATED BATTERY EJECT MECHANISM AND A WARNING LIGHT

FIELD OF THE INVENTION

This invention relates to the field of data processing, and, more particularly, to a data processing device having an improved manually operated battery eject mechanism and a warning light.

BACKGROUND OF THE INVENTION

By way of background, a battery operated digitizer tablet was designed as a data processing device for entering digitized data into a data processing system. The data is created by manually moving a stylus over a tablet similar to handwriting on a pad. The tablet includes a power management system to increase battery life between charges. The tablet also included a light emitting diode (LED) that is turned on when a part of the circuitry is powered on. The LED is turned off when such circuitry is powered off. The tablet also includes a volatile memory that contents of which is stored before turning off the power to such circuitry. Quite obviously, the battery should not be removed before saving the volatile memory contents, and the LED thus provides a signal warning the user not to remove the battery until the light is turned off.

Data processing devices commonly use lights to inform the user. The lights are typically placed on the front or top of a housing in full view of the user. Unfortunately, the lights may be ignored, not seen, misinterpreted, etc. allowing mistakes to occur. When a light is used as a warning to not do something or else adverse results will occur (e.g., don't remove the battery or else you might lose data), it was felt that a more positive approach had to be taken other than by simply placing the light on the front of a housing.

SUMMARY OF THE INVENTION

Thus, one of the objects of the invention is to provide a data processing device with an improved, simple, low cost, light system for warning a user not to eject a battery while the light is in a predetermined state of illumination.

Another object of the invention is to provide a battery eject mechanism with a mechanical and visual interlock that focuses a users attention on a warning light when the user starts to remove a battery.

Briefly, in accordance with the invention, a data processing device has a battery compartment in which a battery is fastened by a releasible latch. A manually actuated eject button is used to release the battery. A light source is placed in or near the eject button and provides, when illuminated, a light signal warning the user not to eject the battery when the light is turned on. The eject button is covered by a door, and both the door and button are designed for two handed operation which, in addition to preventing accidental actuation of the button, forces the user to concentrate attention on the eject button and warning light.

DRAWINGS

Other objects and advantages of the invention will be apparent from the following description taken in connection with the accompanying drawings wherein.

DETAILED DESCRIPTION

Figure 1:
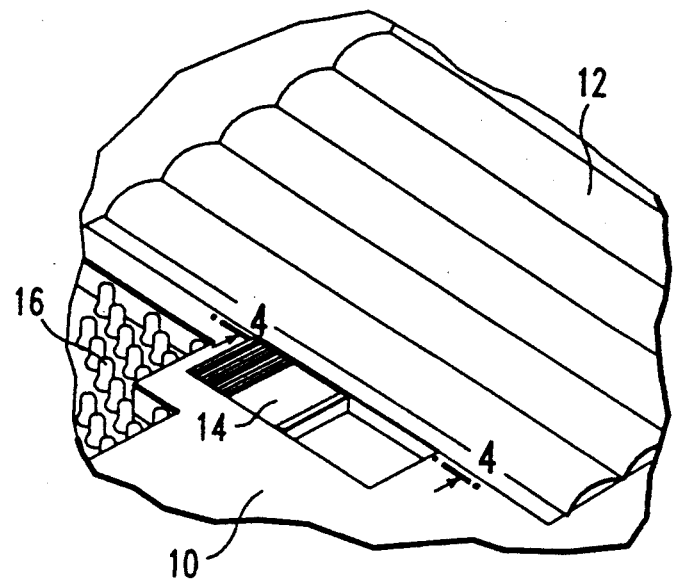
FIG. 1 is an isometric view of a portion of the bottom of data processing device showing a battery and adjacent closed door, of the invention.
Figure 2:
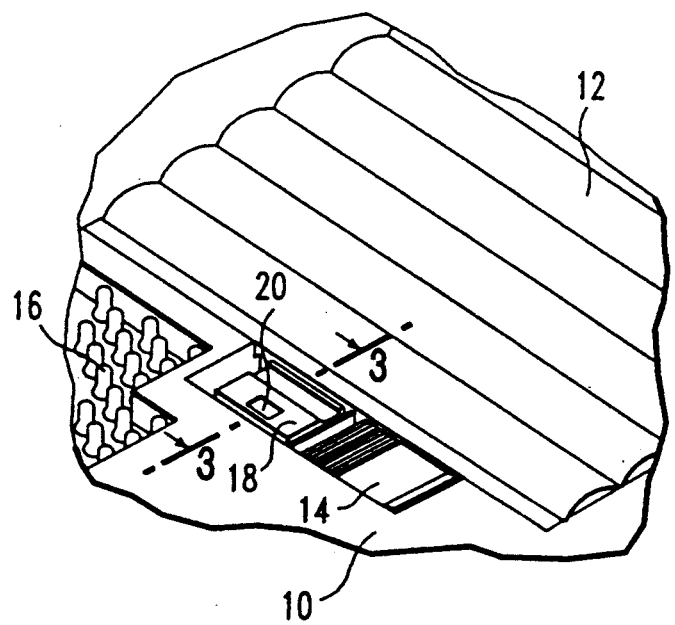
FIG. 2 is a view similar to FIG. 1 showing the door in an open position exposing an eject button and warning light.
Figure 3:
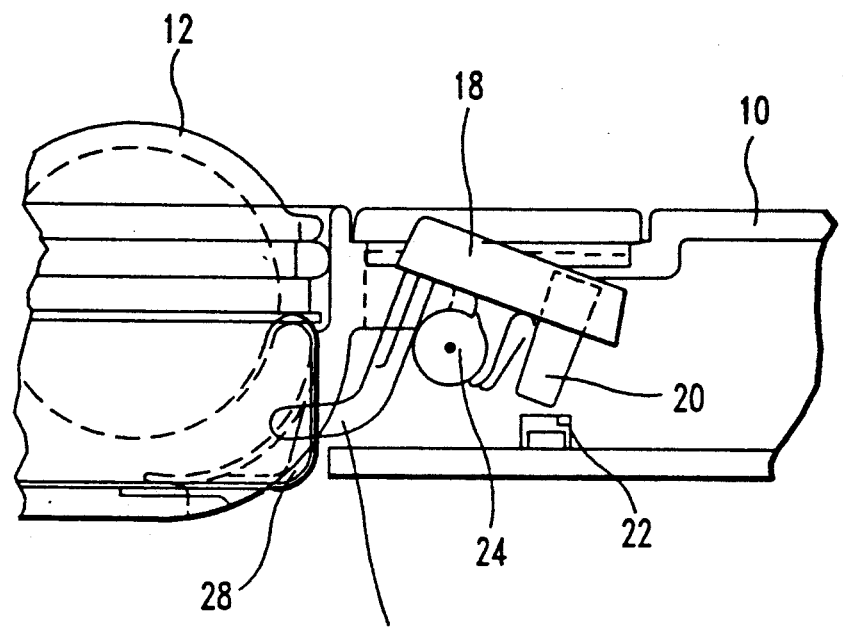
FIG. 3 is a lateral, elevational view, partly in section, through the eject mechanism of the invention.

Referring now to the drawings, and first to FIG. 1, the data processing device includes a base 10 having a battery pack 12 attached to the underside of the base by a releasible latch mechanism 28 shown in FIG. 3. A normally closed, sliding door 14 is mounted on base 10 adjacent battery pack 12 and is movable between the closed position shown in FIG. 1 and an open position shown in FIG. 2. A heat sink 16 is integrated into base 10 in the vicinity of the battery, the heat sink being unrelated to the invention so that further details are not described herein. When door 14 is open, an eject button 18 is exposed along with a light pipe 20 that extends through the eject button.

Figure 4:
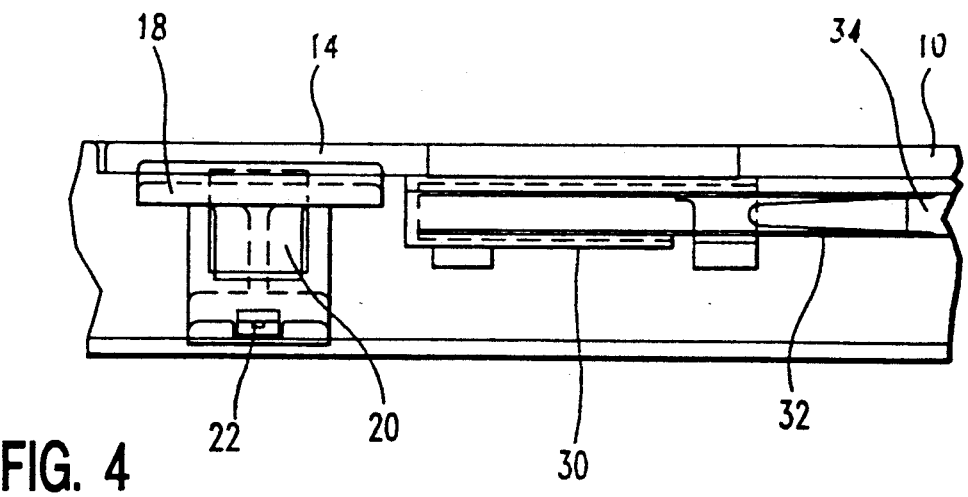
FIG. 4 is a longitudinal elevational view, partly in section, of the eject mechanism of the invention.

As best seen in FIGS. 3 and 4, light pipe 20 overlies an LED 22 mounted on a printed circuit board in base 10. When the LED is activated, light or illumination is directed into the light pipe whereby light passes through eject button 18 and is visible to a user when the door 14 is open. Button 18 is mounted on a pivot 24 for pivotal movement about an axis of rotation that is parallel to the adjacent edge of the battery pack 12. Integral with button 18 is an ejector 26 that abuts a latch spring 28 on the battery pack when the pack is installed. The battery pack is released by pressing on button 18 in the vicinity of light pipe 20 and such action causes ejector 26 to bend latch spring 28 from the full to the dotted line position to release the battery pack.

Door 14 has a cylindrical spring housing 30 integral therewith which encloses one end of a compression spring 32. The other end of spring 32 surrounds a stationary cylindrical rod 34. Spring 32 is pre compressed to bias door 14 towards the closed position and hold it in such normally closed position. Door 14 is opened by manually pushing the exposed portion of the door against the bias of spring 32. When thus opened, the door can be returned to the closed position by releasing the door. The door slides in a direction parallel to the adjacent edge of the battery pack and to the axis of rotation of button 18.

The relative movements of door 14 and of eject button 18 which are required to release the battery pack are at right angles. Such movements are most easily achieved by using a finger of one hand to slide open door 14 after which a finger of another hand can be used to depress eject button 18. Such movements also require the user to focus visual attention on the area of the button which is to be pressed. Since such area contains the end of light pipe 20 from which light emits when LED 22 is activated, it is believed to provide an effective warning to not remove the battery pack so long as light is being emitted.

It should be apparent to those skilled in the art that many changes can be made in the details and arrangements of steps and parts without departing from the scope of the invention as defined in the appended claims.

What is claimed is:

1. In a battery operated data processing device having a housing and a battery pack mounted therein by a releaseable latch mechanism, a battery eject warning system comprising:

a selectively operated eject button mounted in said housing, said eject button being operative in response to manual actuation thereof to release said latch mechanism allowing said battery pack to be removed from said device;

a manually moveable door mounted on said housing, said door being moveable from a normally closed position in which said eject button is hidden from external view to an open position in which said eject button is exposed for view and for manual actuation thereof;

and selectively activated illuminating means mounted in said housing and providing a light source emanating from said eject button, which source is viewable by a user when said door is open.

2. A battery eject warning system in accordance with claim 1 wherein said eject button is operated by pushing a predetermined area thereof, and said light source is located in said area whereby a user's attention is concentrated on such area when such user goes to push said eject button.

3. A battery eject warning system in accordance with claim 2 wherein said illuminating means comprises a light emitting diode mounted adjacent said eject button, and said eject button includes a light pipe having one end adjacent said diode to receive light therefrom and another end forming said light source.

4. A battery eject warning system in accordance with claim 3 wherein said eject button is pivotally mounted for rotation about a first axis, and said door is mounted for sliding movement in a direction parallel to said axis.

5. A battery eject warning system in accordance with claim 4 comprising biasing means connected to said sliding door and biasing said door towards said closed position whereby a user must hold said door open to access said eject button.

* * * * *